(No Model.)
O. H. NIMS.
ADJUSTABLE WINDOW SHADE HOLDER.
No. 546,472. Patented Sept. 17, 1895.
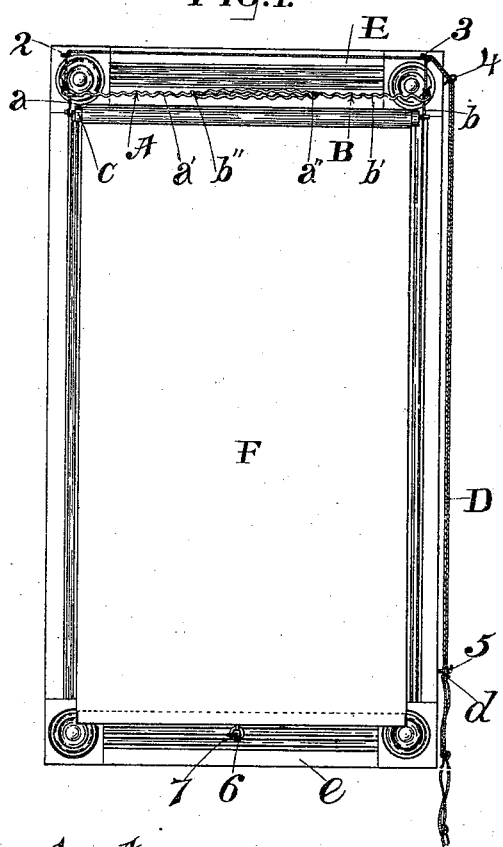
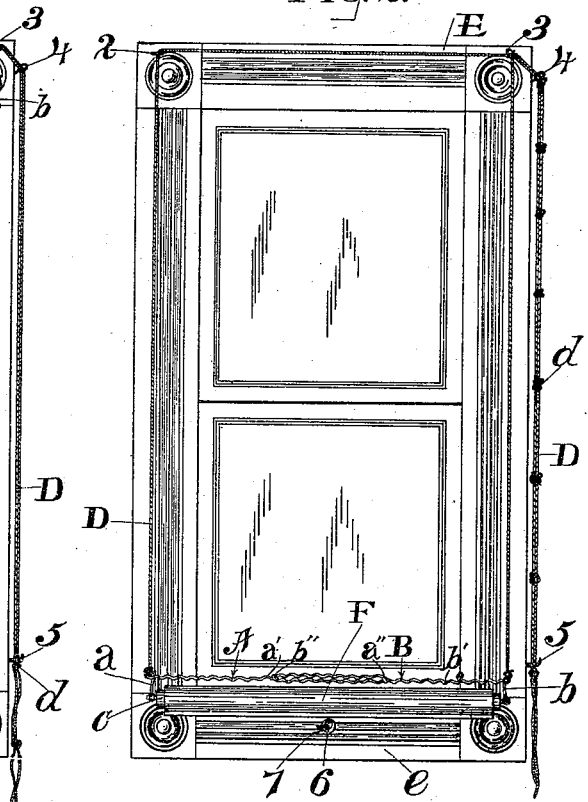
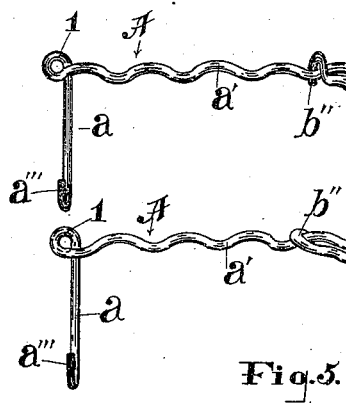
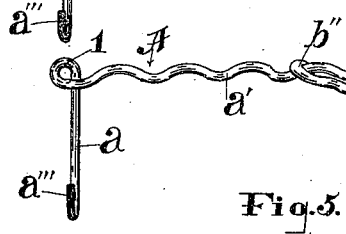
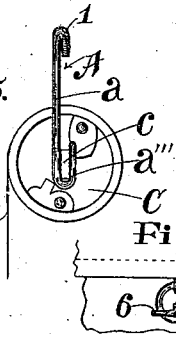
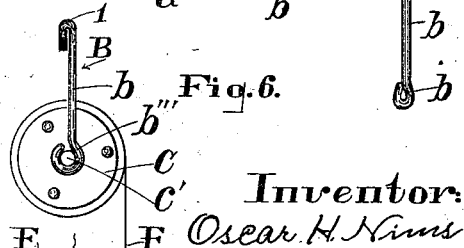
Witnesses:
Jerry Kingman
G. M. Townsend
Inventor:
Oscar H. Nims
by
Hazard & Townsend
his Atty.

UNITED STATES PATENT OFFICE.

OSCAR H. NIMS, OF LOS ANGELES, CALIFORNIA, ASSIGNOR OF ONE-HALF TO CLABEORN P. RANDOLPH, OF SAME PLACE.

ADJUSTABLE WINDOW-SHADE HOLDER.

SPECIFICATION forming part of Letters Patent No. 546,472, dated September 17, 1895.

Application filed June 28, 1895. Serial No. 554,310. (No model.)

*To all whom it may concern:*

Be it known that I, OSCAR H. NIMS, a citizen of the United States, residing at Los Angeles, in the county of Los Angeles and State of California, have invented a new and useful Adjustable Window-Shade Holder, of which the following is a specification.

One object of my invention is to provide a very simple and cheap device for hanging window-shades, by which they can be adjusted to any position desired.

An object of my invention is to construct, of very cheap and common material, a holder for the purpose mentioned, which can be easily applied to curtain-rollers of different lengths; also, to provide a window-shade holder adapted to make the curtain stationary at top or bottom and to run either from the bottom upward or from the top downward, thus making it specially adapted for store show-windows.

Another object of my invention is to provide a holder in which the cord for adjusting the same will be largely hidden from view by being arranged at the edge of the casing instead of in front, so as not to be obtrusive to view nor to be in the way.

My new window-shade holder is made of ordinary round wire, a cord, and common screw-eyes and hooks.

In order to make the holder adjustable to different lengths of curtain-rollers, the wire which forms the same must be made in two pieces to telescope upon each other, and a difficulty to be overcome is the tendency of the round wire to twist upon itself, and I have overcome this difficulty and made the curtain-holder adjustable as to length and adapted to hold at any given length by crimping the wire, as will hereinafter be more fully explained.

The accompanying drawings illustrate my invention.

Figure 1 is an elevation showing my invention in use, with the shade drawn to cover the window. Fig. 2 is an elevation with the shade lowered to the bottom of the window. Fig. 3 is a view of the bracket-bar with its parts just applied to each other ready for fastening, but not fastened. Fig. 4 is a view of the bracket-bar with the sections clamped together. Fig. 5 is an elevation of one end of the bracket-bar and the shade-roller. Fig. 6 is an elevation of the other end of the bracket-bar and the shade-roller. Fig. 7 is a fragmental detail showing the window-shade holding hook and ring.

My invention comprises the bracket-bar composed of two interlocked sections A B of wire, each of which comprises a depending arm $a$ $b$ and a virtually straight crimped member $a'$ $b'$, terminating at one end in a hook $a''$ $b''$, adapted and arranged to clasp the crimped member of the opposite section when the two sections are joined together. One end of the section A is provided with a depending bracket-arm $a$, which is bent at its end to form an angular socket $a'''$ to receive the angular stem $c$ of the shade-roller C and hold the same from turning. The other section B is provided at its end with a depending bracket-arm $b$, the lower end of which is bent to form the round socket $b'''$ to journal the pivot $c'$ of the curtain-roller. Each wire-section A and B is bent at the junction of its crimped member and depending bracket-arm to form the cord-loop 1, into which the ends of the running suspending-cord D are secured. Each loop also forms a spring for its bracket-arm.

2 and 3 indicate cord-sustaining screw-eyes screwed into the top of the window-casing E at a distance apart practically equal to the length of the curtain-roller, and the cord D passes through the screw-eyes 2 and 3 to suspend the curtain.

4 indicates a cord-turning screw-eye set into the top of the casing at the side thereof, and both members of the cord pass through the screw-eye 3 and through the screw-eye 4, and from thence pass downward to a cord-holding hook 5 and toward the bottom of the casing. The hook 5 is set at the edge of the casing near the bottom thereof, and the cord is provided with knots $d$ at intervals, so that it can be fastened over the hook to hold the curtain-roller at any desired height.

6 indicates a shade-holding hook in the window-sill $e$ to hold the ring 7, which is fastened to the bottom of the window-shade F.

In practice the curtain can be drawn down and the ring 7 fastened over the hook 6, and then the curtain-roller can be drawn up or down by the cord with one hand.

The entire curtain and its roller can be raised or lowered by means of the knotted cord and can be adjusted to any position desired. The action for lowering and raising the curtain from and toward the top is the same as that for raising and lowering it from and toward the bottom. If the ring 7 is hooked over the hook 6, the operator can raise and lower the upper part of the curtain, while the lower part of the window remains curtained, thus allowing more or less light to enter the room, and this can conveniently be done with one hand. This feature makes my fixture especially fitted for store show-windows, in which it is desirable to have the shade arranged to let down at the top while dressing the window and in which it is also necessary to sometimes curtain the upper part of the window while the lower part is open. For this reason it is customary to provide the window with an upper and a lower shade. With this feature of my invention the one curtain is sufficient for both purposes. The coils 1 1 serve not only as loops in which the cord can be fastened and held in position, but each also forms a spring, so that the bracket-arms can be spread apart to admit the roller-gudgeons $c$ $c'$, and will then spring back into proper position for holding the roller. To adjust the bracket-bar to a desired length the hooks $a''$ and $b''$ at the ends of the sections are bent up, as shown in Fig. 3, and then the sections are clasped together with the hook of one embracing the crimped arm of the other, and then the hook is bent down into the position shown in Fig. 4. The crimps and the hooks of the two sections interlock, so as to hold the sections from twisting or slipping upon each other. The roller is then placed in position with its pivot-gudgeon $c$ in the round journal of the bracket-arm $b$ and with the angular stationary gudgeon $c'$ in the angular socket $a'''$ of the bracket-arm $a$.

Now, having described my invention, what I claim as new, and desire to secure by Letters Patent, is—

1. In a shade holder the bracket bar set forth composed of two interlocked sections of wire each of which comprises a bracket arm and a crimped member terminating at one end in a hook adapted and arranged to clasp the crimped member of the opposite section.

2. In a shade holder the combination set forth of the wire section comprising a bracket arm bent at its end to form an angular loop, and a virtually straight crimped member connected with the bracket arm and terminating in a hook; and the wire section interlocked therewith and comprising a bracket arm bent at its end to form a round loop, and a virtually straight crimped member connected with the bracket arm and terminating in a hook.

3. In a shade holder the combination set forth of the wire section comprising a bracket arm bent at its ends to form an angular loop, a virtually straight crimped member terminating at one end in a hook, and a spring loop connecting the bracket arm with the crimped member; and the wire section interlocked therewith and comprising a bracket arm bent at its end to form a round loop, a virtually straight member terminating at one end in a hook, and the spring loop connecting such bracket arm and crimped member.

O. H. NIMS.

Witnesses:
JAMES R. TOWNSEND,
F. M. TOWNSEND.